Aug. 15, 1950    F. E. HANSEN    2,518,542
STEAM HOSE COUPLING
Filed July 21, 1948
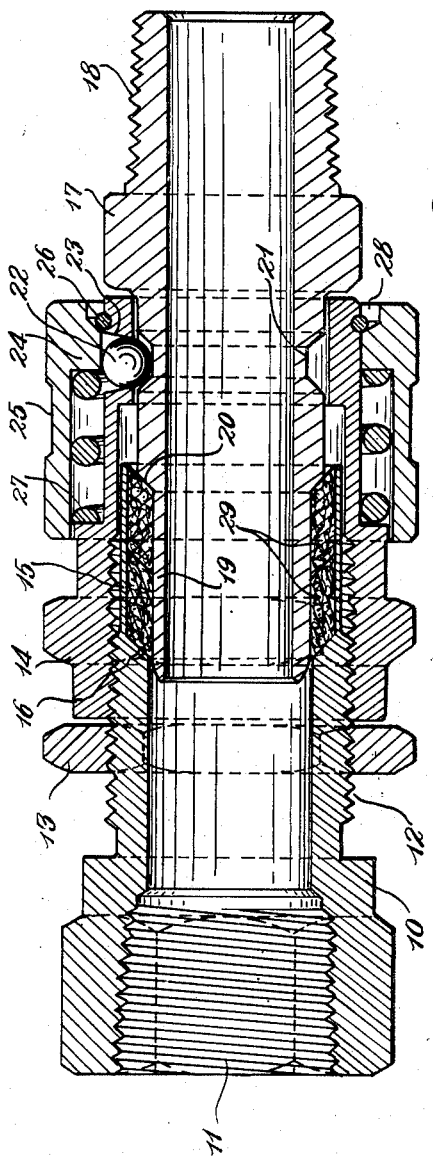
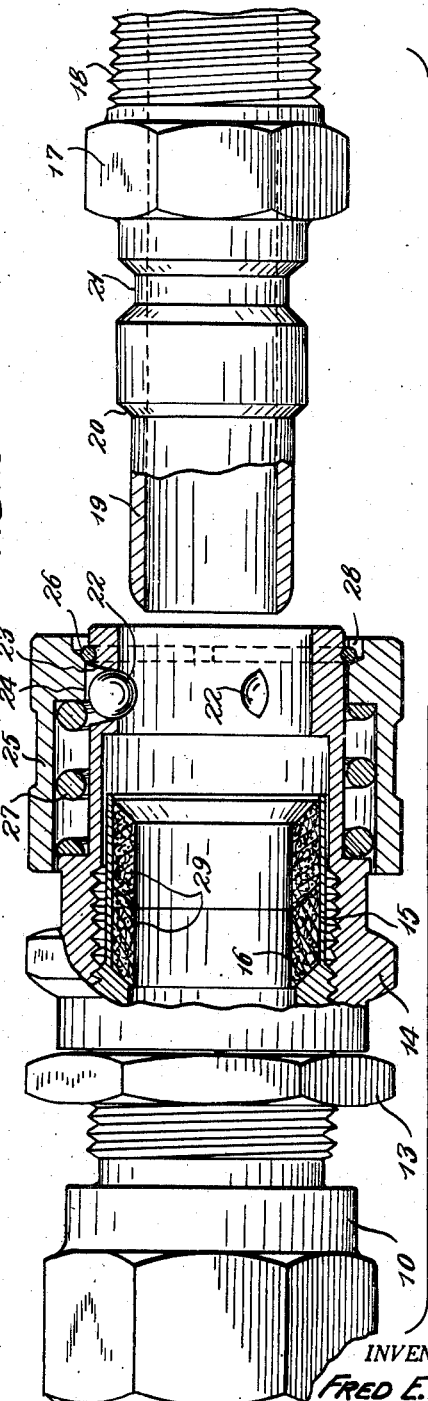
INVENTOR.
FRED E. HANSEN
BY Hudson, Boughton,
Williams, David & Hoffmann.
ATTORNEYS Patented Aug. 15, 1950

2,518,542

UNITED STATES PATENT OFFICE 2,518,542

STEAM HOSE COUPLING

Fred E. Hansen, Lakewood, Ohio

Application July 21, 1948, Serial No. 39,981

2 Claims. (Cl. 285—169)

This invention relates to improvements in steam hose couplings, that is to say couplings for steam lines where in a given line at least one of the steam conductors to be coupled together is flexible, and more especially a coupling of this character the two members of which may be quickly connected or disconnected.

One of the objects of the invention is the provision of a coupling of the character stated embodying convenient means for quick connection or disconnection while retaining excellent sealing properties when the connection is made.

Another object is the provision of means for adjusting the degree of compression applied to the packing when the members of the coupling are brought into connected position and held therein by quick acting detent means.

Other objects and features of novelty will appear as I proceed with the description of that embodiment of the invention which, for the purposes of the present application, I have illustrated in the accompanying drawing, in which Fig. 1 is an elevational view, partly in longitudinal section, of the unassembled coupling, and Fig. 2 is a longitudinal sectional view with the parts assembled.

In the drawing the female member of the coupling is shown at 10, being provided with an internal thread 11 for connection with a pipe or other conductor, not shown. Member 10 is externally threaded for part of its length, as at 12, to receive a lock nut 13 and an internally threaded socket body 14. Member 10 has an internal cylindrical end recess 15 machined therein with a beveled shoulder 16.

A male member or hollow plug 17 is externally threaded at 18 for connection with a steam hose or other conductor, not shown. At its forward end it has a constriction 19 terminating with a beveled shoulder 20, the angle of which may be complementary to the angle of beveled shoulder 16. The external diameter of the constriction 19 is substantially the same as the internal diameter of the female member 10.

Somewhat to the rear of the constricted forward end of member 17 there is an annular groove 21 with beveled side walls which are adapted to receive ball detents 22, of which there may be three or more evenly spaced apart. These balls are carried in conical holes 23 formed in the wall of the socket body 14 near the inner extremity thereof. The small ends of these conical holes being slightly smaller in diameter than the balls 22, the latter are held against movement radially inward further than as shown in the drawing.

Normally the balls 22 are held in their illustrated position by the small diameter end portion 24 of a slidable sleeve 25 which is mounted on the socket body 14. After assembly upon the socket body sleeve 25 is held against movement to the right as viewed in the drawing by a snap ring 26, and the sleeve normally is resiliently held against this ring by a coil spring 27 bearing at one end against a shoulder on the socket body and at the other end against the small diameter end portion 24 of the sleeve. The latter is provided with an annular recess 28 having a radial dimension sufficient to permit the balls 22 to be forced back out of the bore of the socket body 14 when the sleeve 25 is drawn back as far as it will go against the action of spring 27.

A cylinder packing, preferably formed of pressed, graphited asbestos and having tapered end walls conforming with the bevels 16 and 20, is mounted in the recess 15 of the female member. I prefer to form this packing in two equal rings 29, as shown. Such wear as may occur will affect only the outer ring and that ring only will need replacement.

When the two separated parts of the coupling illustrated in Fig. 1 are to be united as in Fig. 2, the operator pulls back the sleeve 25, compressing spring 27 and bringing recess 28 into radial alignment substantially with the balls 22. He then projects the constricted part 19 of the male member into the bore of the socket body. When the beveled surface 20 of the male member strikes the balls they are cammed outwardly into the recess 28. At the same time the constricted part 19 slides into the packing rings 29 which it engages rather snugly. The operator may now release sleeve 25 which however will be prevented from returning to normal position because of the engagement of the balls 22 with the beveled wall surface of recess 28. Continued inward pressure of the male member will bring the annular groove 21 into radial alignment with the balls 22, whereupon the beveled wall surface of recess 28, acting under the pressure of spring 27, will force the balls inwardly into firm engagement with the forward beveled wall of groove 21. In the meantime the packing rings 29 have been compressed between the beveled surfaces 16 and 20 and the walls of the acute angled tapers at the remote ends of the packing rings are jammed into correspondingly shaped angles between the constricted end 19 of the male member and the bevel 16 on the one hand and betweeen the internal wall of the recess 15 and the bevel 20 on the other hand. An excellent seal results without bringing heavy pressure to bear. The degree of compression of the packing is readily controlled by threading the socket body 14 inwardly or outwardly of the female member 10, thereby varying the pressure exerted by the balls 22 against the forward beveled wall of groove 21. The nut 13 serves as a jam not to hold the socket body in adjusted position. Adjustment is necessary at infrequent intervals only.

Having thus described my invention, I claim:

1. In a coupling for a steam line, male and female members, said female member having an internal end recess, an annular packing in said recess engaging the inner surface and end surface of the recess, said male member having a constricted end portion adapted to engage the inner surface and opposite end surface of said packing, an annular socket body adjustably threaded on said female member and overhanging said male member, ball detent means between said male member and the overhanging portion of said socket body, and a spring-pressed slidable sleeve normally locking said detent means in operative position and retractable to permit separation of said coupling members, the adjustment of said socket body serving to control the position of said detent means longitudinally of the coupling and the consequent compression of said packing when said members are forced into coupling relation.

2. In a coupling for a steam line, male and female members, said female member having an internal end recess with a beveled shoulder, said male member having a constricted end portion with a shoulder having a bevel complementary to that of said recess, an annular packing in said recess with tapered ends corresponding to the bevels of said recess and said constricted end portion, whereby when said coupling is joined under pressure the tapered ends of said packing are compressed for sealing the joint between the members, an annular socket body adjustably threaded on said female member and overhanging said male member, ball detent means between said male member and the overhanging portion of said socket member, and a spring-pressed slidable sleeve normally locking said detent means in operative position and retractable to permit separation of said coupling members, the adjustment of said socket body serving to control the position of said detent means longitudinally of the coupling and the consequent compression of said packing, and said beveled shoulder functioning to cam said ball detent means outwardly when said sleeve is retracted and said male member is inserted into said female member.

FRED E. HANSEN.

REFERENCES CITED

The following references are of record in the file of this patent:

UNITED STATES PATENTS

| Number | Name | Date |
|---|---|---|
| 1,324,654 | Ferguson | Dec. 9, 1919 |
| 1,873,304 | Mooy | Aug. 23, 1932 |
| 2,135,222 | Scheiwer | Nov. 1, 1938 |